US007360967B1

United States Patent
Matthews

(10) Patent No.: US 7,360,967 B1
(45) Date of Patent: Apr. 22, 2008

(54) SOLUBILIZATION AND DISPOSAL OF RADIOACTIVE SCALE AND SLUDGE

(75) Inventor: John Charles Matthews, Water Valley, MS (US)

(73) Assignee: University of Mississippi, University, MS (US)

( * ) Notice: Subject to any disclaimer, the term of this patent is extended or adjusted under 35 U.S.C. 154(b) by 0 days.

(21) Appl. No.: 11/410,585

(22) Filed: Apr. 25, 2006

Related U.S. Application Data

(60) Provisional application No. 60/674,431, filed on Apr. 25, 2005.

(51) Int. Cl.
*B09C 1/00* (2006.01)
(52) U.S. Cl. ............ 405/129.1; 588/17; 588/319; 588/407
(58) Field of Classification Search .......... 588/1, 588/17, 250, 319, 407; 423/554, 566.3; 405/129.1
See application file for complete search history.

(56) References Cited

U.S. PATENT DOCUMENTS

| | | | | |
|---|---|---|---|---|
| 1,427,187 | A * | 8/1922 | Bleecker | 75/623 |
| 2,546,903 | A * | 3/1951 | Morrell | 502/424 |
| 3,547,579 | A * | 12/1970 | Pechenick et al. | 423/157 |
| 5,609,836 | A * | 3/1997 | McManus et al. | 422/233 |
| 5,613,242 | A * | 3/1997 | Oddo | 588/17 |

OTHER PUBLICATIONS

Capone, et al., Results of Bench-scale Testing of a Mobile On-site NORM Treatment System in Texas and New Mexico; Awaiting publication.

Fisher, et al. (1994). Characterization of NORM vessel solids. Environmental issues and solutions in petroleum exploration, production and refining. Proceedings of the 6th International Petroleum Environmental Conference, Houston, TX, University of Tulsa and Pennwell, p. 801.

Fisher, S.R. (1995). Naturally occurring radioactive materials (NORM) in produced water and scale from Texas oil, gas, and geothermal wells: Geographic, geologic, and geochemical controls. Texas Bureau of Economic Geology, Geological Circular, 95-3, p. 3-37.

Hargreaves, K. and D.M. Murray (1989) Factors influencing the reduction of barium sulfate. J. Chem. Tech. Biotechnol. 45, p. 319-325.

Matthews, J. C., C. Bogan, C. T. Swann and R. L. Ericksen (2000). A method for quantitative determination of 226Ra and 228Ra in produced formation waters (brines) from oil and gas wells. Radioactivity & Radiochemistry 11, p. 55-65.

Matthews, J.C., Li, S., Swann, C.T. and Ericksen, R.L. (2006) Incubation with top soil enhances solubilization of radium and other components from oil-field scale and sludge: Environmental concerns from Mississippi, Environ. Geosci., 13, 44-53.

(Continued)

*Primary Examiner*—John Kreck
(74) *Attorney, Agent, or Firm*—Stites & Harbison PLLC; Richard S. Myers, Jr.

(57) ABSTRACT

A process to transform solid, low-level, radioactive waste produced from oil and gas production into a form that may be safely disposed of, such as by re-injection into geologic formations in the Earth.

18 Claims, 1 Drawing Sheet

OTHER PUBLICATIONS

Saunders, J. A. and E. L. Rowan (1990). Mineralogy and geochemistry of metallic well scale, Raleigh and Boyken Church oilfields, Mississippi, U.S.A. Trans. Instn. Min. Metall. (Sect. B: Applied Earth Sciences) 99, p. 1-4.

Spaite, P.W. and G.R. Smithson (1992). Technical and regulatory issues associated with naturally occurring radioactive material (NORM) in the oil and gas industry. Gas Research Institute, Final Report, GRI-92/0178, 42 p.

Wilson, A. J. and L. M. Scott (1992). Characterization of radioactive piping scale with an evaluation of subsequent land contamination. Health Physics. 63, p. 681-685.

Zielinski, R. A. and J. K. Otten (1999). Naturally occurring radioactive materials (NORM) in produced water and oilfield equipment—An issue for the energy industry. USGS fact sheet FS-142-99, 4 p.

* cited by examiner

SOLUBILIZATION AND DISPOSAL OF RADIOACTIVE SCALE AND SLUDGE

PRIORITY INFORMATION

This application claims priority to U.S. Application No. 60/674,431, filed Apr. 25, 2005, the contents of which are incorporated herein by reference in their entirety.

FIELD OF THE INVENTION

The present invention relates to the field of oil and gas field waste treatment, and more particularly to the treatment and disposal of radioactive waste from oil and gas production. Additionally, embodiments of the present invention relate to a process of treating and disposing NORM (Naturally Occurring Radioactive Material).

BACKGROUND OF THE INVENTION

A large amount of formation water, brine, is co-produced when oil and gas are pumped to the surface from formations deep in the Earth. It is not unusual for 10 barrels of water to be produced for each barrel of oil. Generally, producing formations are very deep (on the order of 12,000 ft). At these depths it is very hot and the formations are under high pressure. The waters are saturated with many ingredients that are dissolved from the substrata. As they are brought to the surface brines from different reservoirs may become mixed, and temperatures and pressures drop. These changes promote precipitation and condensation reactions. The solutes along with suspended particulates form deposits (scale) on and in the production equipment, and sediment particles composed, at least in part, of precipitated inorganic materials, and rock fragments derived from the producing formation accumulate with oil in tanks and transfer tubing as sludge.

The inorganic compositions of the scales and sludges comprise barite ($BaSO_4$), celestite ($SrSO_4$), anhydrite ($CaSO_4$), witherite ($BaCO_3$), strontianite ($SrCO_3$), calcite ($CaCO_3$) and numerous other components among which may include metallic inclusions of Pb, Cu, Zn, and Ag (Saunders and Rowan, 1990). Radium co-precipitates with the other alkaline earth elements rendering the scales and sludges radioactive. Hydrocarbon production scales and sludges have been reported to contain $^{226}Ra$ activities of anywhere from zero to several thousand Bq/g.

Naturally occurring radioactive material (NORM) is a broad classification that includes any radioactive, naturally-occurring material. Because these solid byproducts of hydrocarbon production contain radium, and the radium content has been enhanced through precipitation reactions as the result of the production of hydrocarbons, they could also be referred to as technologically enhanced NORM i.e. TENORM. It has been estimated that, when all oil and gas field NORM containing scales and sludges are included, between $3 \times 10^5$ and $1 \times 10^6$ tons are produced every year in the United States.

Scale formation can cause restriction or blockage of piping and may cause malfunction of equipment. Maintenance involves periodically removing the scale and sometimes replacing the tubing and other equipment. Sludge buildup in storage tanks reduces their capacities and hinders their operation. Thus, the sludge must also be periodically removed. Each year scale and sludge formation costs hydrocarbon producers millions of dollars in maintenance, treatment, and lost production time. While brines are often disposed of by pumping into injection wells, scales and sludges that contain NORM fall under strict and expensive governmental disposal regulations.

Radium co-precipitates with alkaline earth elements of scale and sludge, rendering these radioactive. The scales and sludges are highly insoluble. In the past, few disposal methods have been available, and many have been based on treating the scale and sludge as low level, solid radioactive waste. Solid radioactive waste disposal is expensive, and presents numerous liability issues for the producer.

At the present time there are few means of disposing of radioactive scale and sludge produced as by-products of oil and gas production. One is "land spreading", where the material is spread on the surface of the ground, tilled into the top of the soil, and then covered with a layer of "clean" soil. After covering, if the level of radioactivity is below governmental action levels, the site may be considered uncontaminated.

Another method is to bury the radioactive scale and sludge in a lined pit, where the material is placed in a pit with a water-impermeable liner, covered with a water-impermeable liner, and then covered with soil.

Another method is to store the scale and sludge in drums at low-level radioactive material storage sites. Several producers of such scale and sludge are required to temporarily store the sludge and scale materials at the production sites over gravel beds, on impermeable liners, while awaiting shipment to storage facilities.

Other methods include dissolution of the sludge and scale with acid and chelation treatment, followed by re-injection into the producing formation. Also, other methods include grinding the solids to a fine particulate, followed by slurrying with water, and re-injection into the producing formation.

Additionally, the radioactive waste material has been used to fill spent well bores, followed by capping with concrete.

There are obvious disadvantages to each of the disposal options outlined above.

For example, disposal at low level radioactive waste storage facilities is expensive, and it generally involves shipping the material from the site where it was produced to a distant site with the attendant transportation risks.

Disposal by land spreading has exposure dangers. Most of the government regulations that allow land spreading also allow the land to be released for unrestricted usage afterward. Additionally, it is unlikely that the material will remain undisturbed for any extended time period after it is deposited. Erosion, burrowing animals, and construction are just some of the ways that the land may be disturbed subsequent to the land farming options.

Disposal by re-injection of slurried powder in water is probably the most permanent and liability free means of disposal, but it is also the most expensive and lowest capacity means of disposal. Enormous pumping pressures are necessary to re-inject slurried solids back into the original formation. In addition, the required pumping pressures consume large quantities of fuel to run the pumps making the process almost prohibitively expensive. A variation of the process involves "fracturing" the formation. This increases the porosity of the rock by creating cracks in the rock, which eases the re-injection process, but it comes with the risk of allowing the material to comingle with other geologic formations including potable ground waters. However, there are advantages to re-injection methods. For example, re-injection serves to keep the formation pressurized, which increases the productive life of the formation.

Since this naturally occurring radioactive material in oil field and gas field waste is becoming a major problem and an increasing burden for oil and gas production companies, the need exists for a simple, effective, and even portable method to effectively treat and deposit such wastes.

The present invention helps meet those needs.

DESCRIPTION OF THE INVENTION

Figure 1:
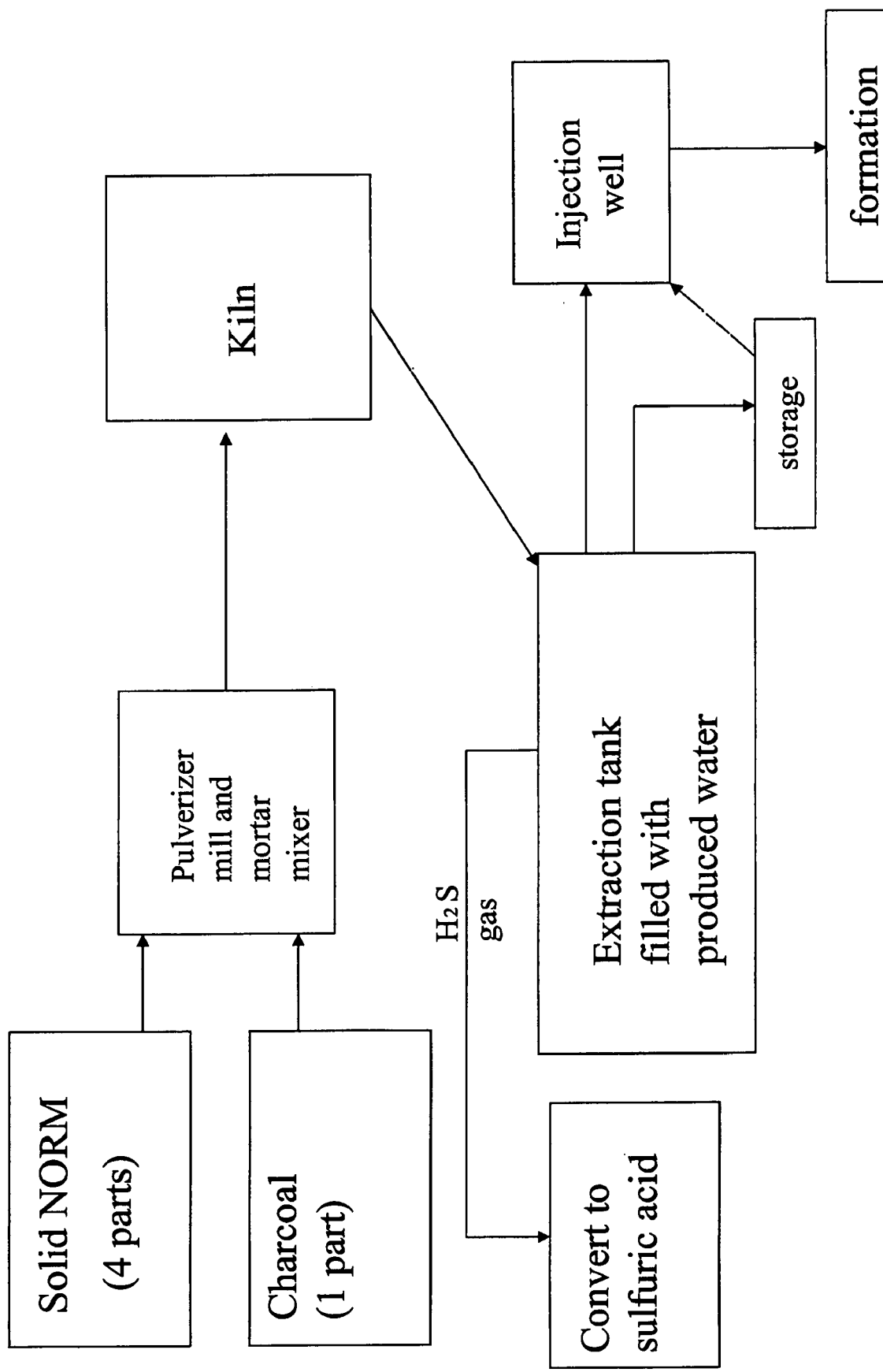
FIG. 1 is a flow chart showing an embodiment of the present invention.

An object of the present invention is a process to transform solid, low-level, radioactive waste produced from oil and gas production into a form that may be safely disposed of, such as by re-injection into geologic formations in the Earth. The present invention includes the benefits of easier disposal, less expensive disposal, and safer disposal. Embodiments of the present invention have been shown to dissolve greater than 90% of the solid material used in the process.

While the process of the present invention is applicable for treating all solid radioactive waste products from oil and gas production, waste products from oil and gas production generally are produced in three forms: (i) tank sludge, which is commonly a fine particulate, wet, and oily; (ii) scale, which is commonly dry but sometimes oily, flakes or pieces up to about 3-4 cm in cross section; and (iii) scale mixed with soil and gravel, which is commonly dry but sometimes oily. Additionally, there may be trash, such as plastic sheeting, etc. that is mixed with the waste described above.

Embodiments of the present invention solubilize the solid, low level, radioactive wastes from oil and gas production such that they can be disposed of by re-injection into a geologic formation, including the option of using the original formation from which the waste originated.

Preferably, embodiments of the present invention are mobile, allowing the process to be performed on site.

As stated above, there are advantages to re-injection methods of disposal. Solubilizing the scales and sludges with the process described herein will allow the material to be re-injected along with the produced waters. Since there are typically no or limited solids involved, the required injection pressures will not be excessive. Thus, the methods of the present invention should be free from problems associated with plugging the rock pores. In turn, there should not be a problem with capacity. It will not be necessary to "fracture" the formations, and thus the likelihood of the material mixing with potable waters from other formations will be no greater than is the case with the brine injection wells.

Additionally, the necessary equipment for solubilizing the scales and sludges can be assembled on truck beds, which can be moved from site to site to process the material at, or near, the production sites. This will greatly reduce the need to transport these radioactive wastes over any great distances. The solubilized product can be returned to brine storage tanks already in place at the production sites for temporary storage until it can be re-injected along with the produced waters. The processing costs will be less than other common, acceptable disposal methods.

With the process of the present invention, the radioactivity and a substantial portion of the solid material can be converted to a water soluble form that can be dissolved, mixed with brine, and re-injected into the producing formation. Any insoluble residue can be surveyed for radioactivity and, when below action levels, disposed of as "clean" soil.

One embodiment of the present invention is a process that generally comprises pulverizing scale, mixing the pulverized scale with a carbon source, heating the mixture to about 1000° C., extracting the reduced product, and re-injecting the reduced product into the geologic formation. An example of the heating period is about two hours. However, the heating period and temperature can vary, as long as a substantially chemically reduced product is produced. The thermal process step of the present invention reduces the scales to barium sulfide.

An example of the carbon source is charcoal, such as powdered charcoal. The charcoal acts as a reducing agent in the reaction mixture. Other sources include wood products such as wood pulp. Furthermore, any form of nonvolatile carbon may be used in accordance with the present invention and an alternative for charcoal. Coal, while an example of a carbon source, is not as preferred, since coal's combustion residues contain uranium and thorium, and therefore would add a new source of solid NORM. Paper, sawdust, leaves, and crop residues, for example, can be used in place of charcoal for this process.

In embodiments of the present invention, scale and sludge are mixed with charcoal in about a 4-1 w/w ratio, pulverized, heated to about 1000° C. in an oxygen-free atmosphere, and cooled to ambient temperature while remaining in an oxygen free atmosphere. During this process the sulfates in the material act as the oxidizing agents to convert carbon from the charcoal to carbon monoxide. As a result the sulfates are fully reduced to sulfides. The sulfates of alkaline earth metals are highly insoluble in water having solubility products on the order of $10^{-10}$ M or lower. The sulfides of the alkaline earth metals are soluble in water and may be readily dissolved preparatory to re-injection. In one embodiment of the present invention, oxygen is excluded the reaction while the material is hot. When oxygen is readmitted before the reaction mixtures cools the sulfides may re-oxidize to sulfites and sulfates. Sulfites are of only limited solubility and they are more soluble in cold water than in hot water.

Sulfides react with water generating $H_2S$ gas, and the corresponding metal hydroxide. In aspects of the present invention, NaCl solutions are usable as solvents for re-dissolving the black ash product, with the end result being the formation of $BaCl_2$. Removal of the sulfur from the mixture prevents any possible reformation of insoluble sulfates and therefore insures continuing stability of the re-dissolved material.

Additionally, in accordance with the present invention, the black ash may be re-dissolved with the produced water (brine), which may have high chloride content. However, produced waters may contain residual concentrations of sulfate salts. When barium (or radium) comes in contact with sulfate ions in solution, they form insoluble precipitates. However, this is not a serious problem. The newly formed precipitates have been found to represent only a fraction of the barium that is re-dissolved. The new precipitates are removed and added to the waste stream, while the now stable, sulfur depleted, barium chloride brines can be re-injected.

As understood when practicing the present invention, $H_2S$ is highly toxic and the re-dissolution process can be accomplished under conditions where the gas will not become a hazard. Thus, in one embodiment, the gas could be oxidized to $SO_2$ as it is generated by burning it in air and collecting the $SO_2$ in a water trap as sulfuric acid. The sulfuric acid, so generated, may have some commercial value to help allay the processing costs.

Other embodiments of the present invention include a mobile process that can include transportable equipment necessary to carry out the present invention. For example, mobile equipment can be mounted on a trailer bed.

The following examples are presented solely for exemplary purposes, and should not be construed as being limiting of the present invention. Specifically, all of the steps presented in the example are not necessary to practice the present invention.

EXAMPLE 1

In this example, sludge and/or scale is treated with a process comprising the following steps:

(1) Trash, if present, is separated from the sludge, washed, and surveyed. If the trash is below acceptable action levels, it can be disposed of as regular trash. The trash washings are handled as discussed in step (6), below.

(2) The wet materials are passed through a rotating drum dryer.

(3) The course particulates will be passed through a roller mill crusher that will break up the scale particles without significantly altering the much harder gravel-type material.

(4) The product from the roller mill is screened (about 3 mm) to separate the gravel from the scale, sand, and soil material.

(5) The gravel is washed and surveyed for radioactivity. When the gravel is below appropriate action levels, it is considered to be "clean," and can be removed from the process (6) The washing water is allowed to settle in a holding tank, and the particulates are passed through the dryer and returned into the solid waste stream.

(7) The screened scale is passed through a pulverizer to break it down to a finer particulate.

(8) The pulverized particulate material (including any dried tank sludge) are mixed with a powdered charcoal in about a 4 to 1 w/w ratio. The materials are placed in an air-tight, valved, ceramic combustion chamber and heated to about 1000° C. for about 2 hours.

(9) After cooling, the reduced product is extracted with boiling water (from step 6) (about 50 ml/g).

(10) The remaining solids are surveyed, and if the radioactivity levels are below action levels they may be disposed of as "clean" soil. If the remaining solids are above action levels they are re-extracted with boiling calcium/sodium chloride solution (natural oil well brine). Residues still above action levels will be returned to the waste product stream.

(11) The extracts are placed in a holding tank to settle, and then they are re-injected into the producing geologic formation. Any solids that settle out are re-washed, surveyed, and handled accordingly.

EXAMPLE 2

Example 1 is repeated, with the equipment needed arranged to allow a mobile treatment facility.

EXAMPLE 3

This Example demonstrates a "mobile" embodiment of the present invention.

(A) Equipment Needed

1. Semi tractor and trailer with canvas sides on which the remaining equipment is installed or loaded for transport from site to site.

2. Five large commercially available walk-in pottery kilns, enclosed in airtight steel cabinets equipped with gas inlets and gas escape valves 3. Five nitrogen gas cylinders with regulators 4. Mortar mixer 5. Pulverizer mill 6. Small front loader 7. 25 stackable ceramic crucibles, 100 gallon capacity 8. 2 extraction tanks, 1000 gallon capacity 9. Water pump and hose 10. Gieger-Mueller counter (B) Procedure 1a. If the scale or sludge contains significant amounts of trash, e.g. plastic sheeting, protective clothing, etc., and when governmental regulations prevent incineration of such materials, suspend the material in a tank of water or brine, the trash may be removed with a paddle, rinsed, and surveyed for radioactivity. When below action levels the trash may then be disposed of as regular trash. After the NORM has settled out of suspension from the trash removal step the wash water is decanted off to be used in step 6 below for dissolving the reduced product. The solid NORM sediment is then treated as described for 1c.

1b. When incineration regulations do not prevent the incineration of the included trash the separation step is not necessary and the procedure can be started directly at 1c.

1c. Mix the material with charcoal (4 to 1 weight ratio), pulverize, and add water or brine to achieve uniform moistness.

2. Pour the mixture into crucibles, and place in the oven with the assistance of the front loader.

3. Seal the metal cabinet and start nitrogen gas flowing into the cabinet.

4. Bring the oven temperature to about 1000° C., and hold at temperature for about 2 hrs, followed by cool down (about 12-16 hrs) keeping nitrogen flowing throughout the heating and cool down process.

5. Remove the crucibles from the cool oven, and pour the residues into an extraction tank.

6. Add water or dilute hydrocarbon production brine to dissolve the residue. Hot water or brine will facilitate the dissolution process, but heating is not an absolute requirement.

7. Decant the solution with the water pump and hose and transfer into a brine storage tank (provided by the waste producer for subsequent disposal by re-injection into the producing formation (accomplished by the waste producer). It is important to note here that this material must not be mixed with sulfate containing brines before or during the injection process.

8. Any solid residue that remains is checked with the Geiger-Mueller counter for radioactivity. If below governmental action levels it is disposed of as clean soil. If above governmental action levels the residue is added back to the waste stream 1c. for repeat processing.

In embodiments of the present invention, a cycle of the process can solubilize more than about 90% of the mass of the material. Additionally, one operator can process five oven loads of material (4 crucibles per oven, one 55 gallon drum of waste per crucible) in an 8 hour work shift. This provides for an overnight cool-down period, and the next day for transferring and dissolving the residues. Thus, a single worker can process 40 or more drums of waste in a one week period.

This disclosure references several publications. All such publications, specifically including those below, are incorporated herein by reference in their entirety.

Fisher, J. B. and M. Hammond (1994). Characterization of NORM vessel solids. Environmental issues and solutions in petroleum exploration, production and refining. Proceedings of the 6th International Petroleum Environmental Conference, Houston, Tex., University of Tulsa and Pennwell, p. 801-802.

Fisher, S. R. (1995). Naturally occurring radioactive materials (NORM) in produced water and scale from Texas oil, gas, and geothermal wells: Geographic, geologic, and geochemical controls. Texas Bureau of Economic Geology, Geological Circular, 95-3, p. 3-37.

Hargreaves, K. and D. M. Murray (1989) Factors influencing the reduction of barium sulfate. J. Chem. Tech. Biotechnol. 45, p. 319-325.

Matthews, J. C., C. Bogan, C. T. Swann and R. L. Ericksen (2000). A method for quantitative determination of $^{226}$Ra and $^{228}$Ra in produced formation waters (brines) from oil and gas wells. Radioactivity & Radiochemistry 11, p. 55-65.

Matthews, J. C., Li, S., Swann, C. T. and Ericksen, R. L. (2006) Incubation with top soil enhances solubilization of radium and other components from oil-field scale and sludge: Environmental concerns from Mississippi, Environ. Geosci., 13, 44-53.

Mississippi State Oil and Gas Board (2002). Mississippi oil and gas production annual report for the year ending Dec. 31, 2001. 380 p.

Saunders, J. A. and E. L. Rowan (1990). Mineralogy and geochemistry of metallic well scale, Raleigh and Boyken Church oilfields, Mississippi, U.S.A. Trans. Instn. Min. Metall. (Sect. B: Applied Earth Sciences) 99, p. 1-4.

Spaite, P. W. and G. R. Smithson (1992). Technical and regulatory issues associated with naturally occurring radioactive material (NORM) in the oil and gas industry. Gas Research Institute, Final Report, GRI-92/0178, 42 p.

Wilson, A. J. and L. M. Scott (1992). Characterization of radioactive piping scale with an evaluation of subsequent land contamination. Health Physics. 63, p. 681-685.

Zielinski, R. A. and J. K. Otten (1999). Naturally occurring radioactive materials (NORM) in produced water and oilfield equipment—An issue for the energy industry. USGS fact sheet FS-142-99, 4 p.

The invention thus being described, it will be obvious that the same can be varied in many ways. All such variations that would be obvious to one of ordinary skill in the art are considered to be part of this present invention and not a variation therefrom.

I claim:

1. A process for treating solid oil or gas production waste, comprising:
    providing an oil or gas product obtained from a subterranean geological formation;
    separating solid production waste from the oil or gas product;
    introducing the solid waste to a carbon material;
    heating the solid waste and carbon material to about 1000° C. or higher to reduce at least a portion of the solid waste to a reduced barium sulfide waste product;
    dissolving the reduced waste product; and
    disposing of the dissolved reduced waste product.

2. The method of claim 1, wherein the solid oil or gas production waste is scale and/or sludge.

3. The method of claim 1, wherein the carbon material is charcoal.

4. The method of claim 3, wherein the solid waste/charcoal mixture is a 4/1 w/w ratio.

5. The method of claim 1, wherein the heating step is in a substantially oxygen-free atmosphere.

6. The method of claim 1, wherein, following the heating step, is a cooling step wherein the mixture is cooled to an ambient temperature.

7. The method of claim 6, wherein the cooling step is in an oxygen-free atmosphere.

8. The method of claim 1, wherein the carbon source includes at least one of paper, sawdust, leaves, crop residues, wood pulp.

9. The method of claim 1, wherein the dissolving step solvent comprises water.

10. The method of claim 1, wherein the dissolving step solvent comprises brine.

11. The method of claim 1, wherein the dissolved reduced waste product is introduced to a NaCl solution.

12. The method of claim 1, wherein the dissolved reduced waste product is deposited in a storage container.

13. The method of claim 1, wherein the dissolved reduced waste product is injected into a geologic formation.

14. The method of claim 1, wherein the solid waste is pulverized.

15. The method of claim 1, comprising employing a kiln, pulverizer mill, and extraction tank.

16. The method of claim 15, wherein at least one of the kiln, pulverizer mill, and extraction tank are situated on a transportable platform.

17. A process for treating solid oil or gas production waste, comprising:
    introducing the solid waste to a pulverizer mill;
    introducing pulverized solid waste and a carbon material into a kiln for heating;
    heating the pulverized solid waste and carbon material to about 1000° C. or higher to reduce at least a portion of the solid waste to a reduced barium sulfide waste product;
    dissolving the reduced waste product in an extraction tank; and
    disposing of the dissolved reduced waste product.

18. The method of claim 17, wherein at least one of the kiln, pulverizer mill, or extraction tank are situated on a transportable platform.

* * * * *